US009335593B2

(12) United States Patent
Nakagawa

(10) Patent No.: US 9,335,593 B2
(45) Date of Patent: May 10, 2016

(54) ELECTRO-OPTIC DEVICE COMPRISING A DATA LINE DISPOSED BETWEEN A TRANSISTOR AND A CAPACITOR AND ELECTRONIC APPARATUS

(71) Applicant: Seiko Epson Corporation, Tokyo (JP)

(72) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 14/157,837

(22) Filed: Jan. 17, 2014

(65) Prior Publication Data

US 2014/0204301 A1 Jul. 24, 2014

(30) Foreign Application Priority Data

Jan. 22, 2013 (JP) ................. 2013-009022

(51) Int. Cl.
*G02F 1/1343* (2006.01)
*G02F 1/1362* (2006.01)

(52) U.S. Cl.
CPC .... *G02F 1/136204* (2013.01); *G02F 1/136213* (2013.01); *G02F 1/136227* (2013.01)

(58) Field of Classification Search
CPC ................................. G02F 1/136204
USPC ....................................... 349/38–39
See application file for complete search history.

(56) References Cited

U.S. PATENT DOCUMENTS

| | | | |
|---|---|---|---|
| 6,411,351 B1 | 6/2002 | Zhang et al. | |
| 6,646,693 B2 | 11/2003 | Zhang et al. | |
| 7,057,677 B2 | 6/2006 | Zhang et al. | |
| 7,226,836 B2 | 6/2007 | Moriwaki | |
| 7,425,999 B2 | 9/2008 | Zhang et al. | |
| 7,787,815 B2 | 8/2010 | Nakamura et al. | |
| 2005/0285988 A1* | 12/2005 | Nakagawa | 349/44 |
| 2007/0045626 A1* | 3/2007 | Murade | G02F 1/1345 257/59 |
| 2008/0192159 A1* | 8/2008 | Ishii | G02F 1/136213 349/39 |
| 2008/0252803 A1* | 10/2008 | Mori et al. | 349/38 |
| 2013/0076717 A1* | 3/2013 | Oikawa | G09G 3/36 345/211 |

FOREIGN PATENT DOCUMENTS

| | | |
|---|---|---|
| JP | 02-256030 A | 10/1990 |
| JP | 10-325963 A | 12/1998 |
| JP | 2005-128309 A | 5/2005 |
| JP | 2007-122071 A | 5/2007 |
| JP | 2007-123297 A | 5/2007 |
| WO | WO-2007-029394 A | 3/2007 |

\* cited by examiner

*Primary Examiner* — Paul Lee
(74) *Attorney, Agent, or Firm* — ALG Intellectual Property, LLC

(57) ABSTRACT

An electrooptic device includes: a first substrate member; an TFT disposed on the first substrate member; a capacitor element which is connected with the TFT and in which an insulation film is sandwiched between a pair of electrodes; a first electric wire electrically connected with one of the pair of electrodes; a second electric wire electrically connected with the other one of the pair of electrodes; a contact hole electrically connected with the first electric wire; and another contact hole electrically connected with the second electric wire. Further, the above two contact holes are provided in an insulation layer that is disposed on the first and second electric wires.

10 Claims, 10 Drawing Sheets

ELECTRO-OPTIC DEVICE COMPRISING A DATA LINE DISPOSED BETWEEN A TRANSISTOR AND A CAPACITOR AND ELECTRONIC APPARATUS

BACKGROUND

1. Technical Field

The present invention relates to electrooptic devices, manufacturing methods of electrooptic devices, and electronic apparatuses.

2. Related Art

As an example of electrooptic devices, for example, a liquid crystal device of an active drive system that includes transistors in each pixel as elements configured to control and switch pixel electrodes is widely known. Liquid crystal devices are used in, for example, a direct-view display, a light valve of a projector, and so on.

In this type of liquid crystal device, an electric wire at a fixed potential side is electrically connected, via a contact hole, with a storage capacitor having a structure in which a dielectric film (insulation film) is sandwiched between a pair of capacitor electrodes as described in JP-A-2005-128309, for example.

However, in the case where both an area of an electric wire connected with one of the pair of the capacitor electrodes (fixed potential side: COM potential) and an area of an electric wire connected with the other capacitor electrode (source potential) are relatively large, static electricity generated in a manufacturing process, for example, accumulates both at a source electric wire side to which the source potential is applied and at a common electric wire side to which the common potential is applied in large quantity (so as to have a large parasitic capacitance). Because of this, excessive static electricity flows from the source electric wire side to the common electric wire side when a pad portion (contact hole) is opened at the common electric wire side, which arises a problem that the dielectric film (insulation film) configuring the storage capacitor is broken down due to the static electricity.

SUMMARY

An advantage of some aspects of the invention is to provide a device, a manufacturing method thereof, and an apparatus capable of solving at least part of the above problem, and the invention can be implemented in the following embodiments and/or application examples.

First Application Example

An electrooptic device according to a first application example includes: a first substrate member; a transistor disposed on the first substrate member; a capacitor which is connected with a source region of the transistor and in which an insulation film is sandwiched between a pair of electrodes; a first electric wire electrically connected with one of the pair of electrodes; a second electric wire electrically connected with the other one of the pair of electrodes; a first contact hole so disposed as to overlap with the first electric wire when viewed from above the first substrate member; and a second contact hole so disposed as to overlap with the second electric wire when viewed from above the first substrate member. Further, the first and second contact holes are provided in an insulation layer that is disposed on the first and second electric wires.

According to this application example, because the first contact hole formed on the first electric wire and the second contact hole formed on the second electric wire are provided in the same insulation layer, static electricity having accumulated at the first electric wire side can be discharged through the first contact hole, while static electricity having accumulated at the second wire side can be discharged through the second contact hole. In other words, by providing the second contact hole, aside from the first contact hole, excessive static electricity having accumulated on the electric wires and electrodes can be suppressed from gathering together and flowing into the first contact hole. That is, it is possible to prevent the capacitor from being broken down by the excessive static electricity. Here, the electric wire electrically connected with one of the electrodes or the other one of the electrodes includes an electric wire using one of the electrode layers or the other one of the electrode layers.

Second Application Example

It is preferable that the electrooptic device according to the above application example further include a first electrode with a metal film embedded in the first contact hole and a second electrode with a metal film embedded in the second contact hole.

According to this application example, at a time of patterning of an electric wire that extends from the first electrode embedded in the first contact hole, it can be prevented to etch a bottom portion of the second contact hole.

Third Application Example

In the electrooptic device according to the above application example, it is preferable that a source potential be applied to the first electrode and a common potential be applied to the second electrode.

According to this application example, since the source potential is applied to the first electrode and the common potential is applied to the second electrode, both the electric wire connected with the first electrode and the electric wire connected with the second electrode have a relatively large area. Accordingly, even if excessive static electricity has accumulated on the first and second electric wires, it is possible to make the static electricity at the first electric wire side be discharged through the first contact hole and make the static electricity at the second electric wire side be discharged through the second contact hole. As a result, the static electricity is suppressed from flowing into a capacitor insulation film so that the capacitor is prevented from being broken down.

Fourth Application Example

A manufacturing method of an electrooptic device according to a fourth application example includes: forming a transistor on a first substrate member; forming, on the transistor, a capacitor which is connected with a source region of the transistor and has a structure in which an insulation film is sandwiched between a pair of electrodes; forming a first electric wire that is electrically connected with one of the pair of electrodes; forming a second electric wire that is electrically connected with the other one of the pair of electrodes; forming an insulation layer on the first electric wire and the second electric wire; and forming, in the insulation layer, a first contact hole to be electrically connected with the first electric wire and a second contact hole to be electrically connected with the second electric wire.

According to this application example, since the first contact hole electrically connected with the first electric wire and the second contact hole electrically connected with the second electric wire are formed in the same insulation layer, it is possible to make static electricity having accumulated at the first electric wire side be discharged through the first contact hole and make static electricity having accumulated at the second electric wire side be discharged through the second contact hole. In other words, by forming the second contact hole, aside from the first contact hole, excessive static electricity having accumulated on the electric wires, electrodes, and the like can be suppressed from gathering together and flowing into the first contact hole. That is, it is possible to prevent the capacitor from being broken down by the excessive static electricity.

Fifth Application Example

It is preferable that the manufacturing method of the electrooptic device according to the above application example further include: forming a first electrode by embedding a metal film in the first contact hole; and forming a second electrode by embedding a metal film in the second contact hole.

According to this application example, the first contact hole and the second contact hole are formed, static electricity is discharged through the first and second contact holes, and then the metal films are embedded in the respective contact holes to form the first electrode and the second electrode. Accordingly, at a time of patterning an electric wire that extends from the first electrode embedded in the first contact hole, it can be prevented to etch the bottom portion of the second contact hole.

Sixth Application Example

In the manufacturing method of the electrooptic device according to the above application example, it is preferable that the source potential be applied to the first electrode and the common potential be applied to the second electrode.

According to this application example, since the source potential is applied to the first electrode and the common potential is applied to the second electrode, both the electric wire connected with the first electrode and the electric wire connected with the second electrode have a relatively large area. Accordingly, even if excessive static electricity has accumulated on the first and second electric wires, it is possible to make static electricity at the first electric wire side be discharged through the first contact hole and make static electricity at the second electric wire side be discharged through the second contact hole. As a result, the static electricity is suppressed from flowing into the capacitor so that the capacitor insulation film is prevented from being broken down.

Seventh Application Example

An electronic apparatus according to a seventh application example includes the electrooptic device described above.

According to this application example, the capacitor can be protected from excessive static electricity in the manufacturing process so that a high production yield can be realized. Moreover, by reducing damage to the capacitor insulation film in the manufacturing process, electronic apparatuses having high reliability can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment in which the invention is embodied will be described with reference to the drawings. Note that the drawings used in the description are illustrated being appropriately enlarged or reduced so that the portions of the drawings referred to in the description become visually recognizable.

In the following embodiment, for example, an expression "on a substrate" indicates a state in which something is disposed on a substrate being in contact with the substrate, a state in which something is disposed on the substrate via another constituent element, or part of something is disposed being in contact with the substrate while another part of something is disposed on the substrate via another constituent element.

In this embodiment, as an example of an electrooptic device, an active matrix liquid crystal device that is equipped with thin film transistors (TFTs) as pixel switching elements will be described. This liquid crystal device is a device that can be preferably used, for example, as an optical modulation element (liquid crystal valve) of a projection display apparatus (liquid crystal projector).

Configuration of Electrooptic Device

Figure 1:
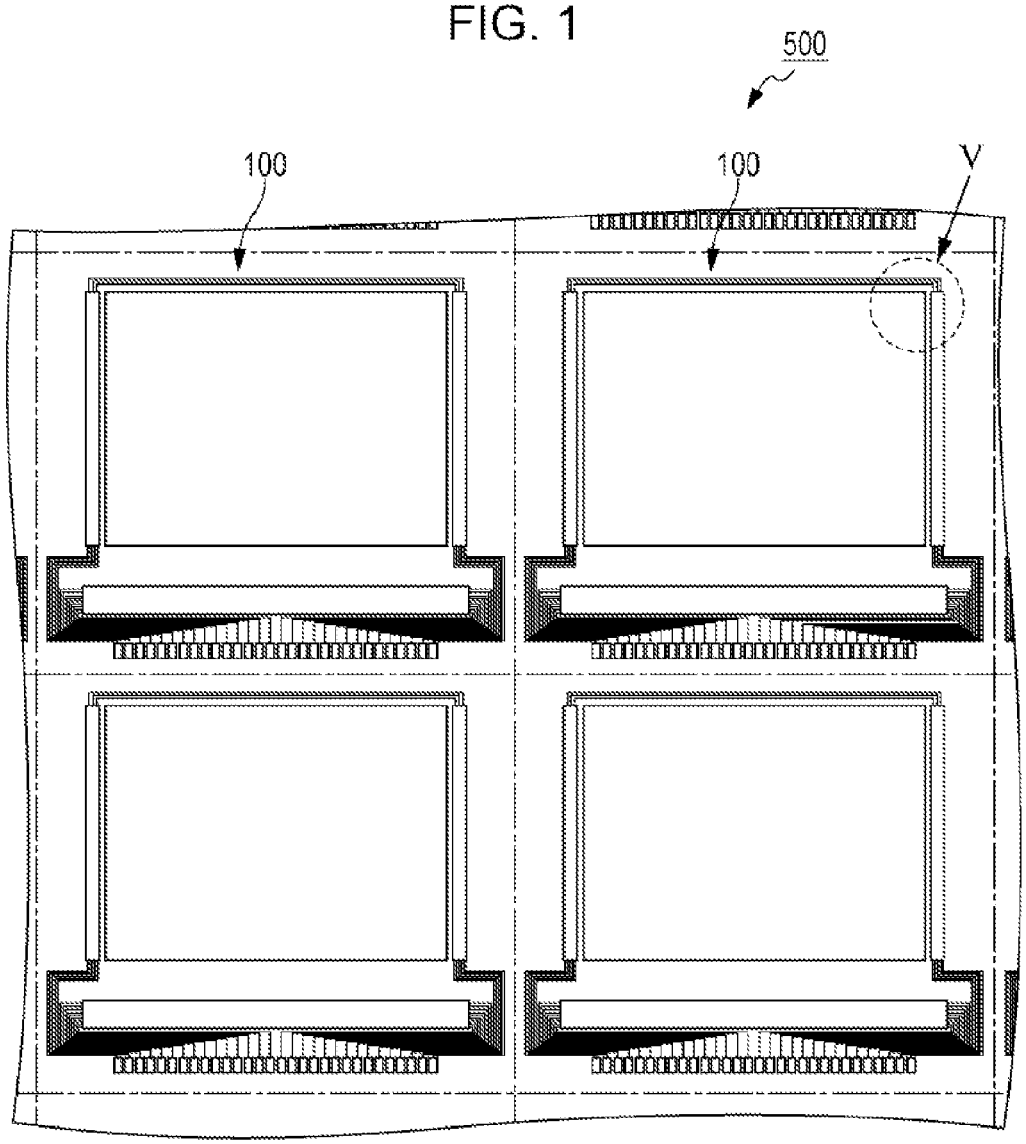
FIG. 1 is a schematic plan view illustrating a configuration of part of a wafer where a plurality of liquid crystal devices as electrooptic devices are arranged thereon.
Figure 2:
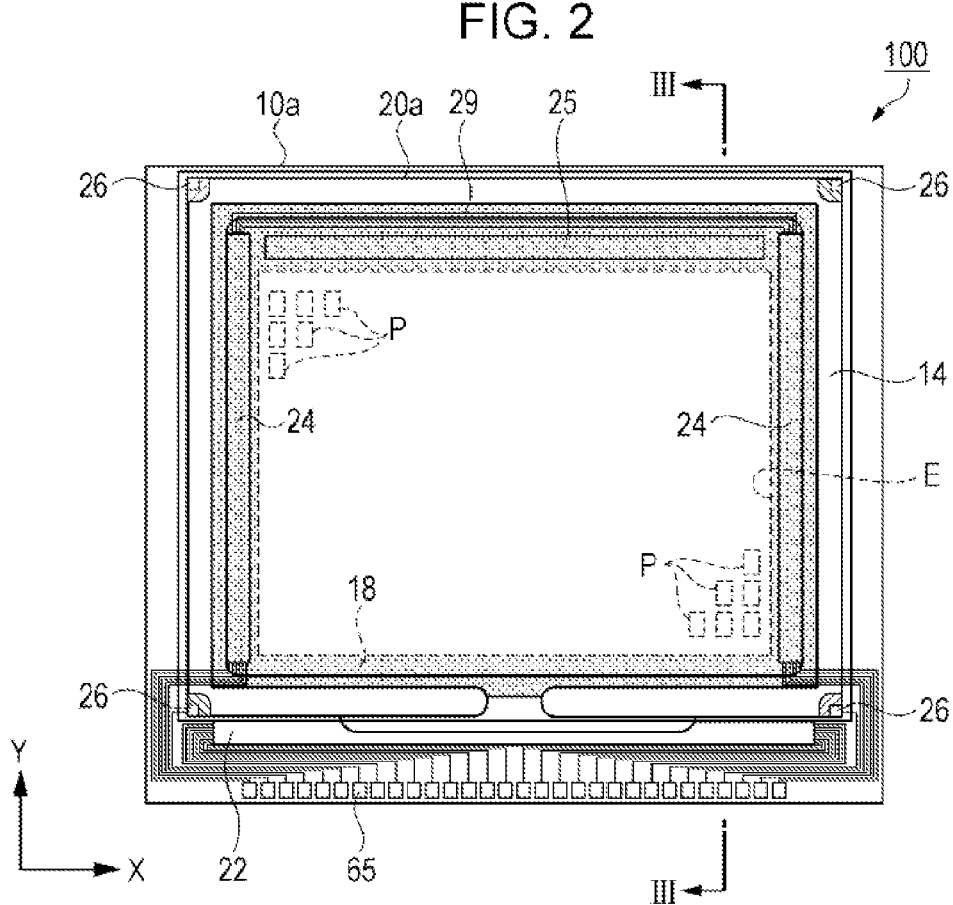
FIG. 2 is a schematic plan view illustrating a configuration of a liquid crystal device.
Figure 3:
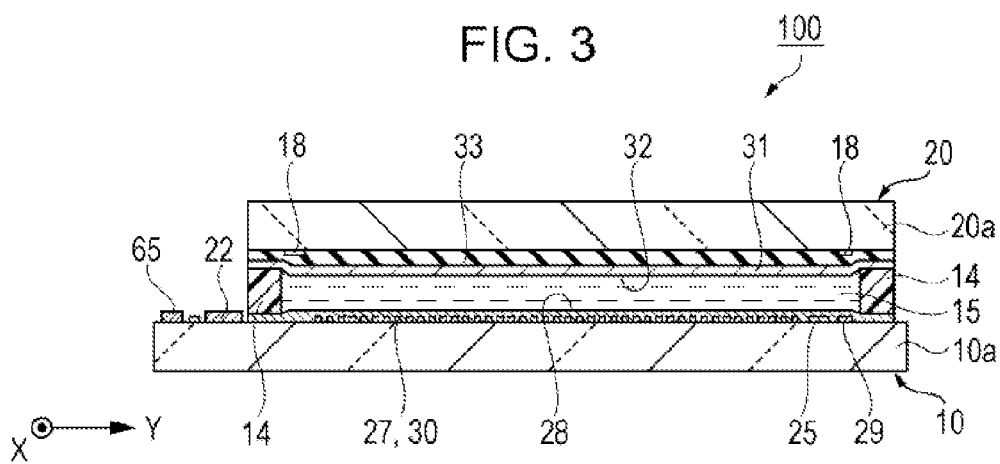
FIG. 3 is a schematic cross-sectional view cut along a III-III line of the liquid crystal device in FIG. 2.
Figure 4:
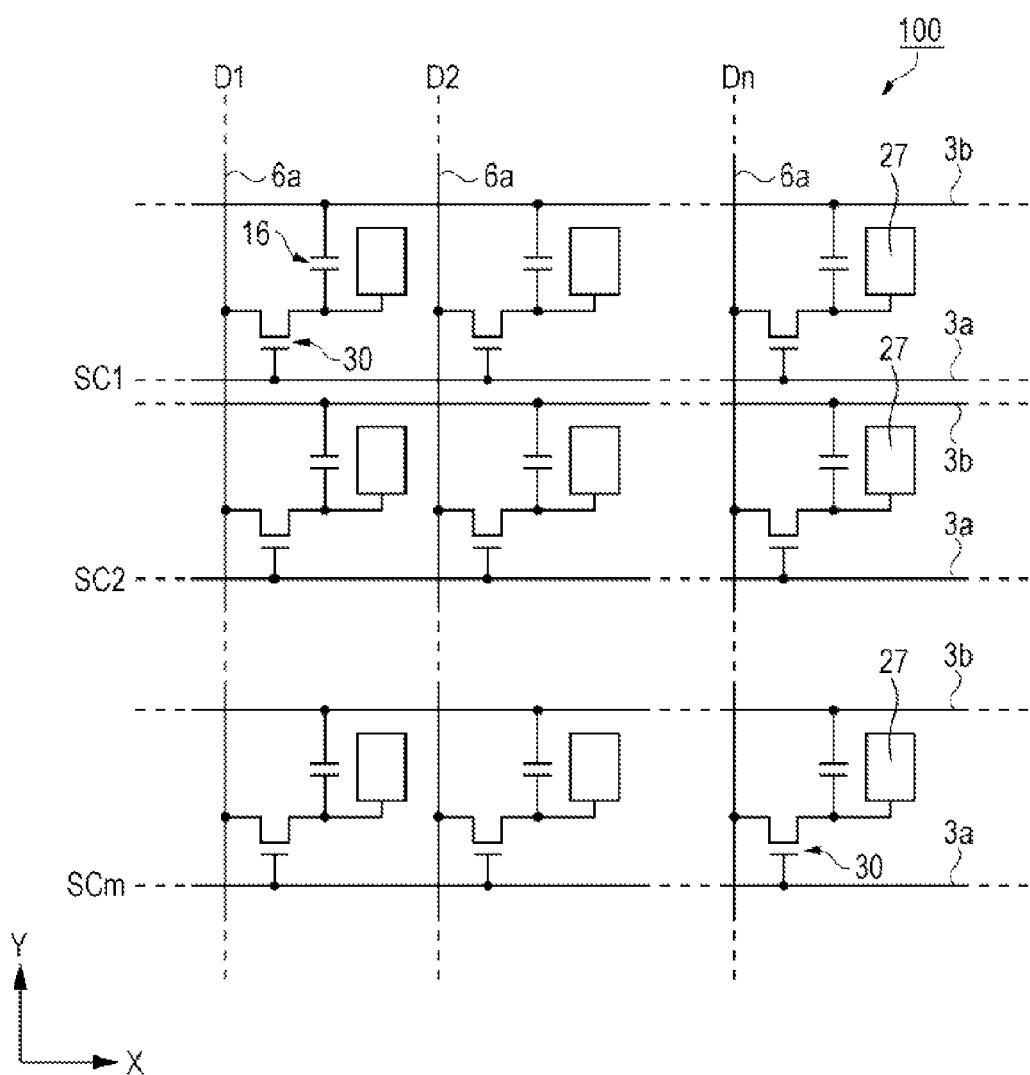
FIG. 4 is an equivalent circuit diagram illustrating an electric configuration of a liquid crystal device.

FIG. 1 is a schematic plan view illustrating a configuration of part of a wafer where a plurality of liquid crystal devices as electrooptic devices are arranged thereon. FIG. 2 is a schematic plan view illustrating a configuration of a liquid crystal device. FIG. 3 is a schematic cross-sectional view cut along a III-III line of the liquid crystal device in FIG. 2. FIG. 4 is an equivalent circuit diagram illustrating an electric configuration of a liquid crystal device. Hereinafter, the configuration of the liquid crystal device will be described with reference to FIGS. 1 through 4.

As shown in FIG. 1, for example, one of a pair of substrates (for example, element substrate) configuring a liquid crystal device 100 is attached to a wafer 500. Note that, in this case, a plurality of element substrates are arranged on the wafer 500 in matrix form. Size of the wafer 500 is 8 inches, for example. Thickness of the wafer 500 is, for example, 1.2 mm. The material of the wafer 500 is quartz, for example. Hereinafter, the configuration of the liquid crystal device 100 will be described.

As shown in FIGS. 2 and 3, the liquid crystal device 100 according to this embodiment includes an element substrate 10 and an opposite substrate 20 that are opposed to each other, and a liquid crystal layer 15 sandwiched between the above paired substrates. Transparent substrates such as a glass substrate, a quartz substrate, and the like are used in a first substrate member 10a configuring the element substrate 10 and a second substrate member 20a configuring the opposite substrate 20.

The element substrate 10 is larger in size than the opposite substrate 20, and both the substrates are connected via a seal material 14 disposed along an outer circumference of the opposite substrate 20. Inside the seal member 14 that is circularly provided in a plan view, liquid crystal having positive or negative dielectric anisotropy is injected into a space between the element substrate 10 and the opposite substrate 20 so as to configure the liquid crystal layer 15. An adhesive such as a thermosetting or ultraviolet curing epoxy resin, for example, is employed to the seal material 14. A spacer (not shown) is mixed in the seal member 14 so as to maintain the interval between the pair of substrates to be constant.

Inside the seal material 14, a display region E in which a plurality of pixels P are arranged is provided. Although not illustrated in FIGS. 2 and 3, there is provided in the opposite substrate 20 a light shielding film (black matrix; BM) that two-dimensionally defines the plurality of pixels P within the display region E.

A data line driving circuit 22 is provided in a region between the seal member 14 along one side of the element substrate 10 and the stated one side. Further, a diagnostic circuit 25 is provided between the display region E and the seal material 14 along other one side opposed to the stated one side. Furthermore, scanning line driving circuits 24 are provided between the display region E and the seal material 14 along other two sides that are opposed to each other and orthogonal to the stated one side. There are provided a plurality of electric wires to connect the two scanning line driving circuits 24, between the diagnostic circuit 25 and the seal material 14 along the other one side opposed to the stated one side.

A light shielding film 18 (parting section) is provided on the opposite substrate 20 between the display region E and the circularly disposed seal material 14. The light shielding film 18 is made of, for example, metal, metal oxide, or the like having a light shielding property, and the inner side of the light shielding film 18 is the display region E having a plurality of pixels P. Although not illustrated in FIG. 2, there is also provided a light shielding film in the display region E so as to two-dimensionally define the plurality of pixels P.

Electric wires respectively connected to the data line driving circuit 22 and the scanning line driving circuits 24 are connected with a plurality of external connection terminals 65 arranged along the stated one side. In the following descriptions, a direction along the stated one side is referred to as an "X direction", while a direction along the other two sides that are opposed to each other and orthogonal to the stated one side is referred to as a "Y direction".

As shown in FIG. 3, on a surface of the first substrate member 10a on the liquid crystal layer 15 side, there are formed light transmitting pixel electrodes 27 that are provided for each pixel P, thin film transistors (TFTs, hereinafter called "TFTs 30") as switching elements, signal wirings, and an alignment layer 28 configured to cover these constituent elements.

Further, a light shielding structure is employed so as to prevent switching operation from being unstable due to the light entering into a semiconductor layer of the TFT 30. The element substrate 10 of this invention includes at least the pixel electrode 27, the TFT 30, and the alignment layer 28.

On a surface of the opposite substrate 20 on the liquid crystal layer 15 side, there are formed the light shielding film 18, a flattening layer 33 so deposited as to cover the light shielding film 18, an opposite electrode 31 so provided as to cover the flattening layer 33, and an alignment layer 32 configured to cover the opposite electrode 31. The opposite substrate 20 of this invention includes at least the opposite electrode 31 and the alignment layer 32.

The light shielding film 18, as illustrated in FIG. 2 in a simplified manner, is provided at a position surrounding the display region E and overlapping with the scanning line driving circuits 24 and the diagnostic circuit 25 in a plan view. By doing so, light entering from the opposite substrate 20 side into a peripheral circuit including these driving circuits is blocked so as to prevent the peripheral circuit from performing a false operation caused by the light. In addition, the light shielding film 18 blocks unnecessary stray light from entering the display region E so as to ensure a higher contrast of the display in the display region E.

The flattening layer 33 is made of an inorganic material such as oxide silicon, for example, has a light-transmissive property, and is so provided as to cover the light shielding film 18. As a forming method of the flattening layer 33, a deposition method using plasma CVD (Chemical Vapor Deposition) or the like can be given, for example.

The opposite electrode 31 is made of a transparent conductive film such as indium tin oxide (ITO), for example, and covers the flattening layer 33. In addition, as shown in FIG. 2, the opposite electrode 31 is electrically connected with the electric wires at the element substrate 10 side by conductive material 26 as conductive portions provided in four corners of the opposite substrate 20.

The alignment layer 28 covering the pixel electrodes 27 and the alignment layer 32 covering the opposite electrode 31 are selected based on optical design of the liquid crystal device 100. For example, an inorganic alignment layer that is substantially perpendicularly-oriented with respect to liquid crystal molecules having negative dielectric anisotropy, can be cited; this inorganic alignment layer is made of an inorganic material such as $SiO_x$ (oxide silicon) deposited by a vapor deposition method.

The liquid crystal device 100 mentioned above is a transmissive type and employs optical design of the normally white mode in which the transmittance ratio of a pixel P when a voltage is not applied thereto is larger than that when the voltage is applied thereto so as to give light display, or optical design of the normally black mode in which the transmittance ratio of a pixel P is smaller when a voltage is not applied thereto than that when the voltage is applied thereto so as to give dark display. Polarizing elements are disposed at a light incidence side and a light output side respectively in accordance with the optical design.

As shown in FIG. 4, the liquid crystal device 100 includes, at least in the display region E, a plurality of scanning lines 3a and a plurality of data lines 6a that are insulated from and orthogonal to each other as well as capacitor lines 3b. A direction in which the scanning line 3a extends is the X direction, while a direction in which the data line 6a extends is the Y direction.

In a region that is defined by the scanning line 3a, the data line 6a and the capacitor line 3b, and also by related signal lines thereof, there are provided the pixel electrode 27, the TFT 30, and a capacitor element 16 as a capacitor so as to configure a pixel circuit of the pixel P.

The scanning line 3a is electrically connected with the gate of the TFT 30, and the data line 6a is electrically connected with a data line side source drain region (source region) of the TFT 30. The pixel electrode 27 is electrically connected with a pixel electrode side source drain region (drain region) of the TFT 30.

The data lines 6a are connected with the data line driving circuit 22 (see FIG. 2) and supply the pixels P with image signals D1, D2, . . . , Dn supplied from the data line driving circuit 22. The scanning lines 3a are connected with the scanning line driving circuits 24 (see FIG. 2) and supply the pixels P with scanning signals SC1, SC2, . . . , SCm supplied from the scanning line driving circuits 24.

The image signals D1 through Dn to be supplied to the data lines 6a from the data line driving circuit 22 may be supplied line sequentially in this order, or may be supplied to the data lines 6a in groups each configured of multiple data lines 6a adjacent to each other. The scanning line driving circuits 24 supply the scanning signals SC1 through SCm to the scanning lines 3a at a predetermined timing.

The liquid crystal device 100 is configured so that the image signals D1 through Dn are written into the pixel electrodes 27 at a predetermine timing when the TFTs 30 as switching elements are made in an ON state for a set period by the scanning signals SC1 through SCm being inputted. Further, the image signals D1 through Dn at a predetermined level that have been written into the liquid crystal layer 15 via the pixel electrodes 27 are retained for a set period between the pixel electrodes 27 and the opposite electrode 31 opposed to each other via the liquid crystal layer 15.

In order to prevent leakage of the retained image signals D1 through Dn, the capacitor element 16 is connected in parallel to a liquid capacitor formed between the pixel electrode 27 and the opposite electrode 31. The capacitor element 16 is provided between the pixel electrode side source drain region of the TFT 30 and the capacitor line 3b. The capacitor element 16 includes a dielectric layer between the two capacitor electrodes.

Figure 5:
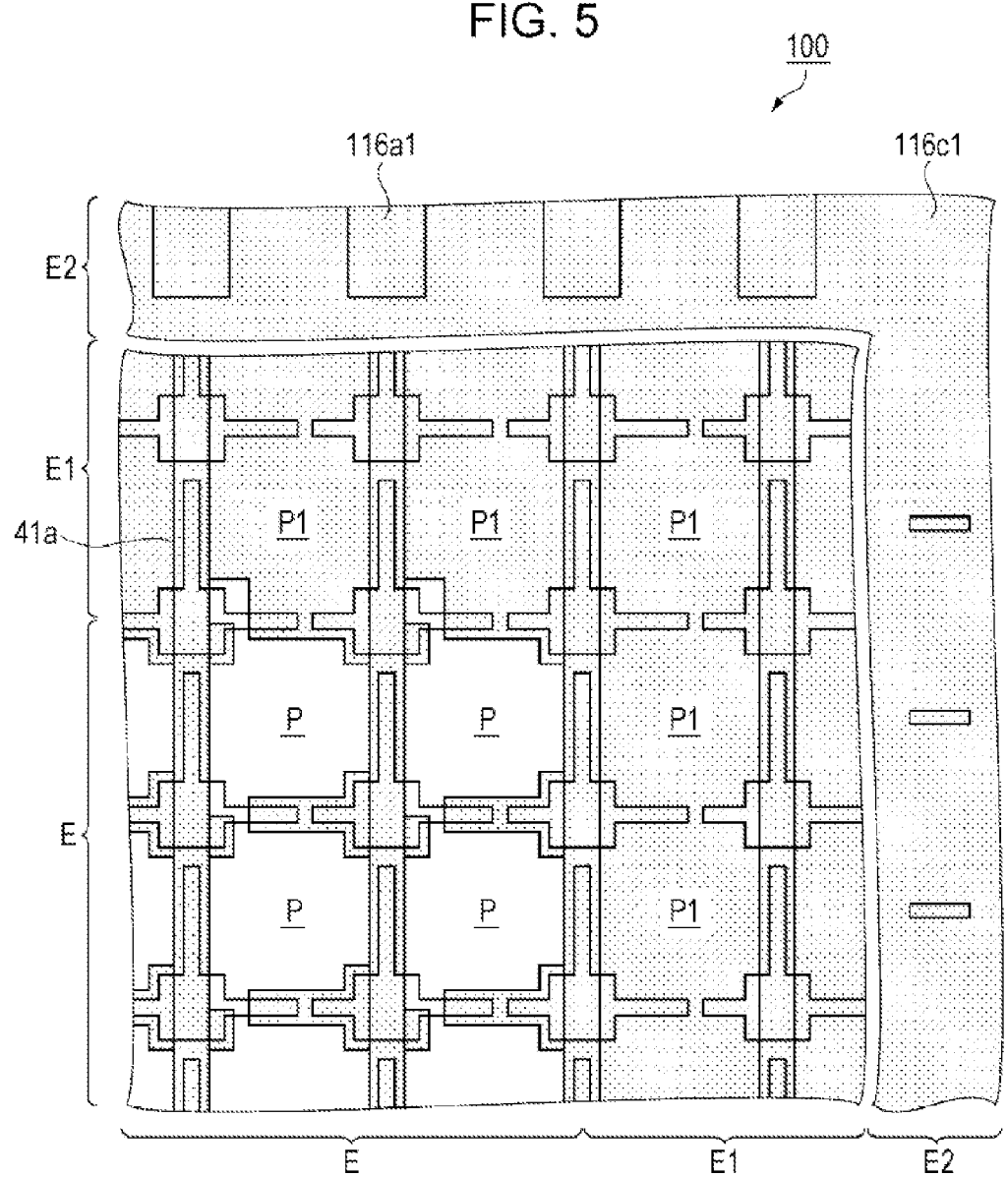
FIG. 5 is an enlarged plan view where a portion V of the wafer shown in FIG. 1 is enlarged and illustrated.
Figure 6:
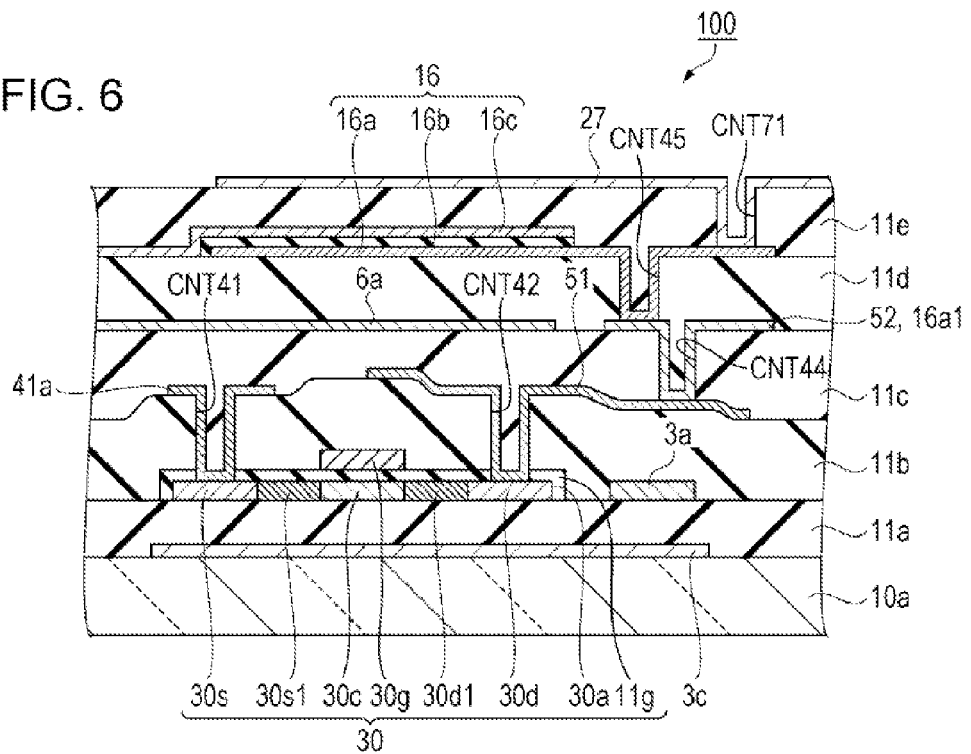
FIG. 6 is a schematic cross-sectional view illustrating part of a structure of the liquid crystal device shown in FIG. 5.
Figure 7:
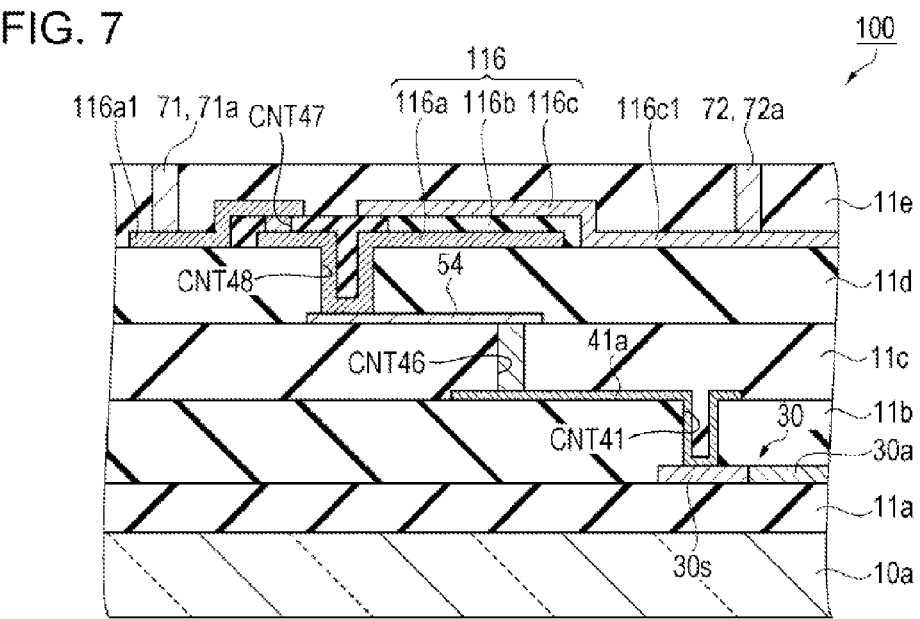
FIG. 7 is a schematic cross-sectional view illustrating a structure of the periphery of a source line load capacitor element.

FIG. 5 is an enlarged plan view where a portion V of the wafer shown in FIG. 1 is enlarged and illustrated. FIG. 6 is a schematic cross-sectional view illustrating part of a structure of the liquid crystal device shown in FIG. 5. FIG. 7 is another schematic cross-sectional view illustrating part of the structure of the liquid crystal device shown in FIG. 5. Hereinafter, the structure of the liquid crystal device will be described with reference to FIGS. 5 through 7. Note that FIGS. 6 and 7 illustrate a positional relationship between the constituent elements in a cross-sectional view, and are given on a scale with which each constituent element can be expressed.

As shown in FIG. 5, in the liquid crystal device 100, the display region E is provided in the center area where a plurality of pixels P are arranged. In a surrounding area of the display region E, there is provided a dummy display region E1 having the same structure as that of the pixel P. Further, in a surrounding area of the dummy display region E1, there is provided a non-display region E2 where a source line load capacitor element 116 as a capacitor (see FIG. 7) and the like are disposed.

As shown in FIGS. 5 and 7, in the liquid crystal device 100, a first electric wire 116a1 (data line) connected with the source region and a second electric wire 116c1 so as to be a common potential, which configure the source line load capacitor element 116, are formed across the entire panel, whereby a wiring pattern of these electric wires has a wide area.

As a result, static electricity accumulated during the manufacture of the liquid crystal device 100 is largely accumulated (so as to have a large parasitic capacitance) both at a first load capacitor electrode 116a side and at a second load capacitor electrode 116c side, which configure the source line load capacitor element 116. Hereinafter, the cross-sectional structure of the liquid crystal device 100 will be described.

Configuration of Electrooptic Apparatus

As shown in FIG. 6, a lower-side light shielding film 3c made of titanium (Ti), chromium (Cr), tungsten (W), or the like is formed on the first substrate member 10a. The lower-side light shielding film 3c is two-dimensionally patterned in lattice form so as to define an opening region of each pixel. The lower-side light shielding film 3c may function as part of the scanning line 3a. A foundation insulation layer 11a made of a silicon oxide film or the like is formed on the first substrate member 10a and the lower-side light shielding film 3c.

On the foundation insulation layer 11a, the TFT 30, the scanning line 3a, and the like are formed. The TFT 30 has, for example, an LDD (Lightly Doped Drain) structure including a semiconductor layer 30a made of polysilicon or the like, a gate insulation film 11g formed on the semiconductor layer 30a, and a gate electrode 30g made of a polysilicon film or the like formed on the gate insulation film 11g. As described above, the scanning line 3a also functions as the gate electrode 30g.

The semiconductor layer 30a is formed as an N-type TFT 30 by injecting N-type impurity ions such as phosphorus (P) ions, for example. To be more specific, the semiconductor layer 30a includes a channel region 30c, a data line side LDD region 30s1, a data line side source drain region 30s, a pixel electrode side LDD region 30d1, and a pixel electrode side source drain region 30d.

In the channel region 30c, P-type impurity ions such as boron (B) ions or the like are doped. In other regions (30s1, 30s, 30d1, 30d), N-type impurity ions such as phosphorus (P) ions or the like are doped. As described above, the TFT 30 is formed as an N-type TFT.

A first interlayer insulation layer 11b made of a silicon oxide film or the like is formed on the gate electrode 30g, the foundation insulation layer 11a, and the scanning line 3a. In the first interlayer insulation layer 11b, two contact holes CNT41 and CNT42 are provided at the positions overlapping with end portions of the semiconductor layer 30a in a plan view.

More specifically, a conductive film is deposited using a light shielding conductive material such as aluminum (Al) so as to fill the contact holes CNT41 and CNT42 and so as to cover the first interlayer insulation layer 11b, and then the deposited conductive film is patterned, whereby the contact holes CNT41 and CNT42, a data line 41a connected with the data line side source drain region 30s via the contact hole CNT41, and a relay electric wire 51 connected with the pixel electrode side source drain region 30d via the contact hole CNT42 are formed.

The data line 41a and the relay electric wire 51, together with a shield line 6a to be explained later, shield the TFT 30 from light. A second interlayer insulation layer 11c is provided on the data line 41a and the relay electric wire 51 so as to cover the data line 41a, the relay electric wire 51, and the first interlayer insulation layer 11b. In the second interlayer insulation layer 11c, a contact hole CNT44 is so provided as to overlap with part of the relay electric wire 51.

To be more specific, a conductive film is deposited using a light shielding conductive material such as aluminum (Al) so as to fill the contact hole CNT44 and so as to cover the second interlayer insulation layer 11c, and then the deposited conductive film is patterned, whereby the shield line 6a and a relay electric wire 52 are formed.

The shield line 6a is applied, for example, a fixed potential such as the common potential so as to serve as a shield layer to prevent a signal of the data line 41a from influencing a first capacitor electrode 16a to be as a drain potential which will be explained later.

A third interlayer insulation layer 11d is provided on the shield line 6a and the relay electric wire 52 so as to cover the shield line 6a, the relay electric wire 52, and the second interlayer insulation layer 11c. The third interlayer insulation layer 11d is made of, for example, silicon oxide, nitride, or the like, and flattening processing may be performed thereon to flatten unevenness of the surface generated by covering the TFT 30 or the like. As a method of flattening processing, chemical mechanical polishing (CMP processing), spin coat processing, and the like can be cited.

The first capacitor electrode 16a configuring the capacitor element 16 is provided being patterned on the third interlayer insulation layer 11d. On the first capacitor electrode 16a, a dielectric film 16b configuring the capacitor element 16 is laminated.

As the dielectric film 16b, silicon compounds such as a silicon oxide film, a silicon nitride film, and the like can be used. In addition, dielectric layers of high permittivity such as an aluminum oxide film, a titanium oxide film, a tantalum oxide film, a niobium oxide film, a hafnium oxide film, a lanthanum oxide film, a zirconium oxide film, and so on can be also used.

A second capacitor electrode 16c configuring the capacitor element 16 is patterned and laminated on the dielectric film 16b. The second capacitor electrode 16c is disposed being superimposed on the first capacitor electrode 16a via the dielectric film 16b, and configures, together with the first capacitor electrode 16a and the dielectric film 16b, the capacitor element 16.

More specifically, the first capacitor electrode 16a as a pixel potential side capacitor electrode that is electrically connected with the pixel electrode 27 and the pixel electrode side source drain region 30d (drain region) of the TFT 30, and part of the second capacitor electrode 16c as a fixed potential side capacitor electrode are disposed facing each other via the dielectric film 16b, thereby forming the capacitor element 16.

The first capacitor electrode 16a and the second capacitor electrode 16c may be configured with a single metal, an alloy, metal silicide, poly-silicide, material laminating these components or the like, including at least one of the metals having a high melting point such as titanium (Ti), chromium (Cr), tungsten (W), tantalum (Ta), molybdenum (Mo), and so on, for example. Alternatively, the above capacitor electrodes can be formed by an aluminum (Al) film.

Further, an end portion of the first capacitor electrode 16a overlaps with part of the relay electric wire 52 (16a1) in a plan view, and is electrically connected with an extended portion of the relay electric wire 52 via a contact hole CNT45 provided in the third interlayer insulation layer 11d.

On the second capacitor electrode 16c, there is provided a pad insulation layer 11e as an insulation layer so as to cover the second capacitor electrode 16c and the third interlayer insulation layer 11d. The pad insulation layer 11e is made of, for example, silicon oxide, nitride, or the like, and flattening processing is often performed thereon to flatten unevenness of the surface generated by covering the electric wires and electrodes.

On the pad insulation layer 11e, there is provided the light transmitting pixel electrode 27 made of an ITO film or the like. The pixel electrode 27 is electrically connected with an extended portion of the first capacitor electrode 16a via a contact hole CNT71 provided in the pad insulation layer 11e.

As described above, the pixel electrode 27 and the first capacitor electrode 16a are electrically connected with the pixel electrode side source drain region 30d (drain region) of the semiconductor layer 30a via the relay electric wire 52, the contact hole CNT44, the relay electric wire 51, and the contact hole CNT42.

Further, in the pad insulation layer 11e, a contact hole (not shown) for discharging static electricity is provided on a second electric wire 16c1 in a region overlapping with part of the second electric wire (not shown) connected with the second capacitor electrode 16c in a plan view. This makes it possible to suppress an excessive current from flowing into the capacitor element 16 by discharging static electricity having accumulated on the second capacitor electrode 16c and the second electric wire by discharging static electricity through the contact hole. Display operation is not influenced by the contact hole because the contact hole is provided in a region outside the display region E.

On the pixel electrode 27 and the pad insulation layer 11e, the alignment layer 28 in which an inorganic material such as silicon dioxide ($SiO_2$) is obliquely evaporated is provided (see FIG. 3). On the alignment layer 28, there is provided the liquid crystal layer 15 where liquid crystal and the like are injected in a space surrounded by the seal material 14 (see FIG. 3).

Configuration of Source Line Load Capacitor Element

Next, a structure of the periphery of the source line load capacitor element 116 will be described with reference to FIG. 7. As shown in FIG. 7, the data line side source drain region 30s (source region) of the semiconductor layer 30a is electrically connected with the first load capacitor electrode 116a configuring the source line load capacitor element 116 via the contact hole CNT41, the data line 41, and a contact hole CNT46.

The source line load capacitor element 116 is configured by a load dielectric film 116b (insulation film) disposed on the first load capacitor electrode 116a and the second load capacitor electrode 116c disposed on the load dielectric film 116b. A source potential is applied to the first load capacitor electrode 116a. The common potential is applied to the second load capacitor electrode 116c.

One side of the first load capacitor electrode 116a, to which the source potential is applied, is electrically connected with the data line 41a by a contact hole CNT48, a relay electrode 54, and the contact hole CNT46, while the other side thereof is electrically connected with the first electric wire 116a1 via a contact hole CNT47. The first electric wire 116a1 is electrically connected with a first pad portion 71 as a first electrode provided in the pad insulation layer 11e. That is, the data line potential is so configured as to be exposed, not through a transistor, on the substrate surface.

Further, the second load capacitor electrode 116c, to which the common potential is applied, is electrically connected with the second electric wire 116c1 being extended. The second electric wire 116c1 is electrically connected with a second pat portion 72 as a second electrode. The second pad portion 72 is provided being exposed from the liquid crystal device 100, for example.

As described above, aside from the second pad portion 72 to which the common potential is applied, the first pad portion 71 to which the source potential is applied is provided in the same pad insulation layer 11e in which the second pad portion 72 is provided. Accordingly, it is possible for static electricity having accumulated at the first electric wire 116a1 (source region 30s) side to be discharged through a contact hole CNT71a (first contact hole) before the first pad portion 71 being formed. Meanwhile, static electricity having accumulated at the second electric wire 116c1 side (common potential side) can be discharged through a contact hole CNT72a (second contact hole) before the second pad portion 72 being formed.

Therefore, it is possible to suppress static electricity having accumulated at the source potential side and the common potential side from flowing into the source line load capacitor element 116, and prevent the breakdown of the source line load capacitor element 116.

Manufacturing Method of Electrooptic Device

FIGS. 8A through 8C and FIGS. 9D, 9E are schematic cross-sectional views illustrating a manufacturing method of the periphery of a source line load capacitor element included in an overall manufacturing method of the liquid crystal device as an electrooptic device. Hereinafter, a manufacturing method of the liquid crystal device will be described with reference to FIGS. 8A through 8C and FIGS. 9D and 9E. Note that FIGS. 8A through 8C and FIGS. 9D, 9E are intended to describe in a simplified manner a cross-sectional structure of the liquid crystal device shown in FIG. 7.

Figure 8A:
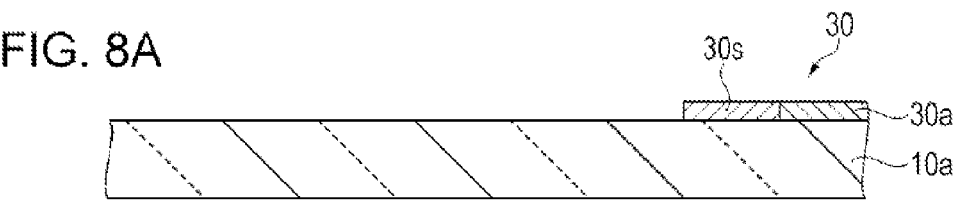
FIGS. 8A through 8C are schematic cross-sectional views illustrating part of a manufacturing method included in an overall manufacturing method of a liquid crystal device.

First, in a process shown in FIG. 8A (transistor formation process), the TFT 30 is formed on the first substrate member 10a made of a glass substrate or the like using a known film deposition technique, a known photography technique, and a known etching technique.

Figure 8B:
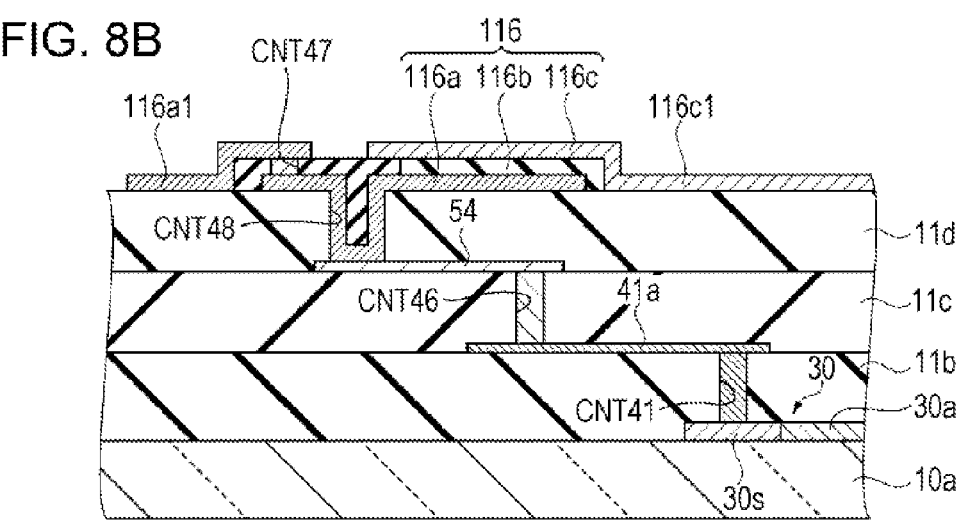

In a process shown in FIG. 8B (capacitor formation process, first electric wire formation process, second electric wire formation process), the source line load capacitor element 116 is formed on an upper layer of the TFT 30. More specifically, the first interlayer insulation layer 11b, made of a silicon oxide film or the like, is first deposited on the TFT 30 and the first substrate member 10a. As a manufacturing method of the first interlayer insulation layer 11b, a CVD method (Chemical Vapor Deposition) is used, for example. Thereafter, the contact hole CNT41 is formed in the first interlayer insulation layer 11b. Then, the data line 41a electrically connected with the contact hole CNT41 is formed on the first interlayer insulation layer 11b.

Next, the second interlayer insulation layer 11c is formed on the data line 41a and the first interlayer insulation layer 11b using the CVD method or the like. Thereafter, flattening processing such as CMP processing is performed to flatten unevenness of the surface of the second interlayer insulation layer 11c. Subsequently, the contact hole CNT46 is formed in the second interlayer insulation layer 11c by etching. Then, the third interlayer insulation layer 11d is formed on the second interlayer insulation layer 11c.

Next, a relay electric wire 54 electrically connected with the contact hole CNT46 is formed on the third interlayer insulation layer 11d. Thereafter, the contact hole CNT48 electrically connected with the relay electric wire 54 is formed in the third interlayer insulation layer 11d.

Next, the source line load capacitor element 116 is formed on the third interlayer insulation layer 11d. To be more specific, flattening processing such as the CMP process is performed first to flatten unevenness of the surface of the third interlayer insulation layer 11d. Subsequently, on the third interlayer insulation layer 11d, the first load capacitor electrode 116a that fills the contact hole CNT48 and configures the source line load capacitor element 116 is formed. Thereafter, the remaining portions of the source line load capacitor element 116 (load dielectric film 116b, second load capacitor electrode 116c) and the like are formed similarly on the third interlayer insulation layer 11d using a known film deposition technique, a known photolithography technique, and a known etching technique.

The first load capacitor electrode 116a is electrically connected with the source region 30s of the TFT 30 and the first electric wire 116a1 via the contact hole CNT47. Further, the second load capacitor electrode 116c is electrically connected with second electric wire 116c1 to which the common potential is applied.

Figure 8C:
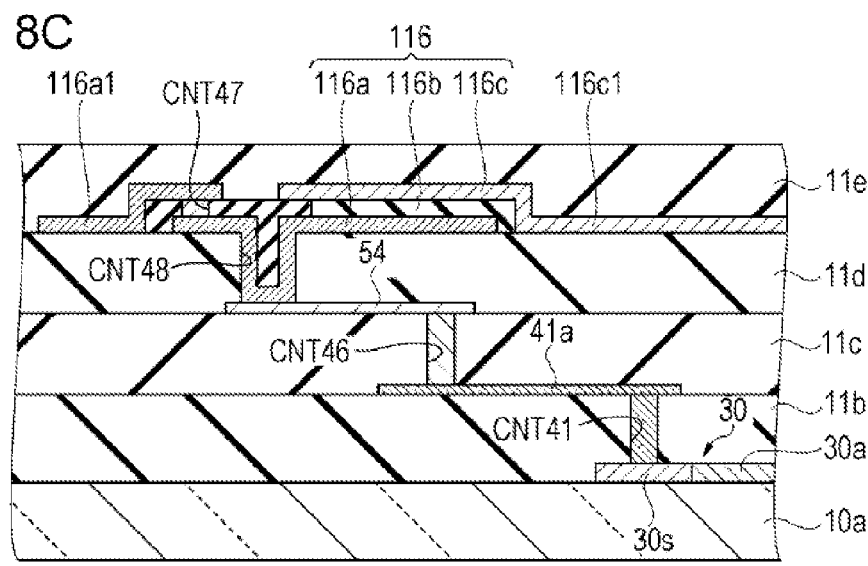

In a process shown in FIG. 8C (insulation layer formation process), the pad insulation layer 11e is formed so as to cover the source line load capacitor element 116. More specifically, the insulation layer is deposited using the CVD method or the like, for example. Thereafter, flattening processing such as the CMP processing is performed to flatten unevenness of the surface of the pad insulation layer 11e.

Figure 9D:
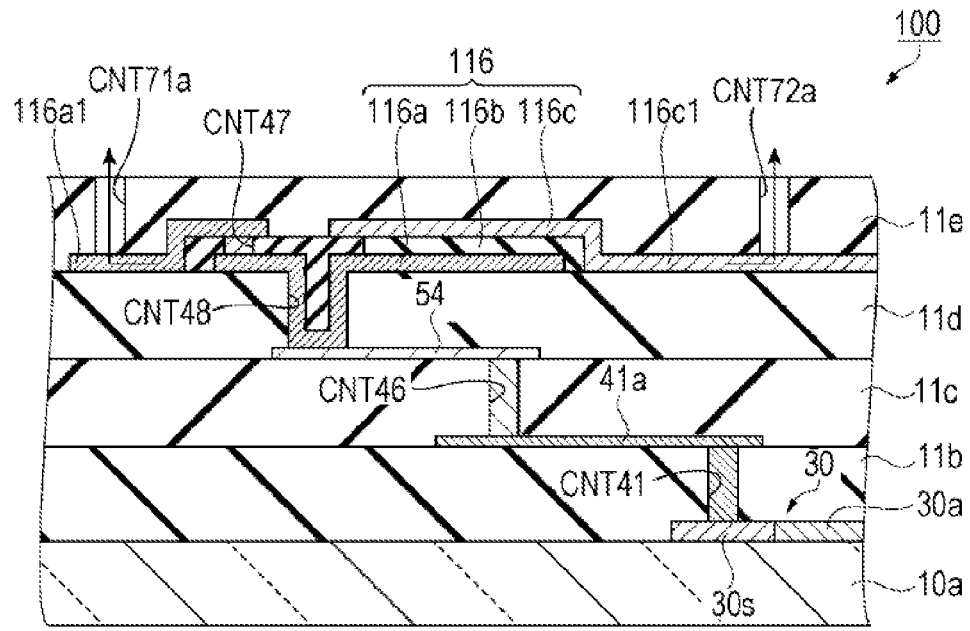
FIGS. 9D and 9E are schematic cross-sectional views illustrating part of a manufacturing method included in the overall manufacturing method of the liquid crystal device.

In a process shown in FIG. 9D (contact hole formation process), the contact holes CNT71a and CNT72a are formed in the pad insulation layer 11e. To be more specific, in the pad insulation layer 11e, the contact hole CNT71a is formed at a position overlapping with the first electric wire 116a1 in a plan view, and the contact hole CNT72a is formed at a position overlapping with the second electric wire 116c1 in a plan view.

As described above, at the time when the contact hole CNT71a connected to the first load capacitor electrode 116a (116a1) is opened, the contact hole CNT72a connected to the second load capacitor electrode 116c (116c1) is opened in the same pad insulation layer 11e. Accordingly, it is possible to discharge static electricity having accumulated at the first load capacitor electrode 116a side through the contact hole CNT71a, and discharge static electricity having accumulated at the second load capacitor electrode 116c side connected to the common potential (the side of fixed potential side capacitor electrode) through the contact hole CNT72a. In other words, because excessive static electricity does not flow in the load dielectric film 116b, it is possible to prevent the breakdown of the source line load capacitor element 116.

Figure 9E:
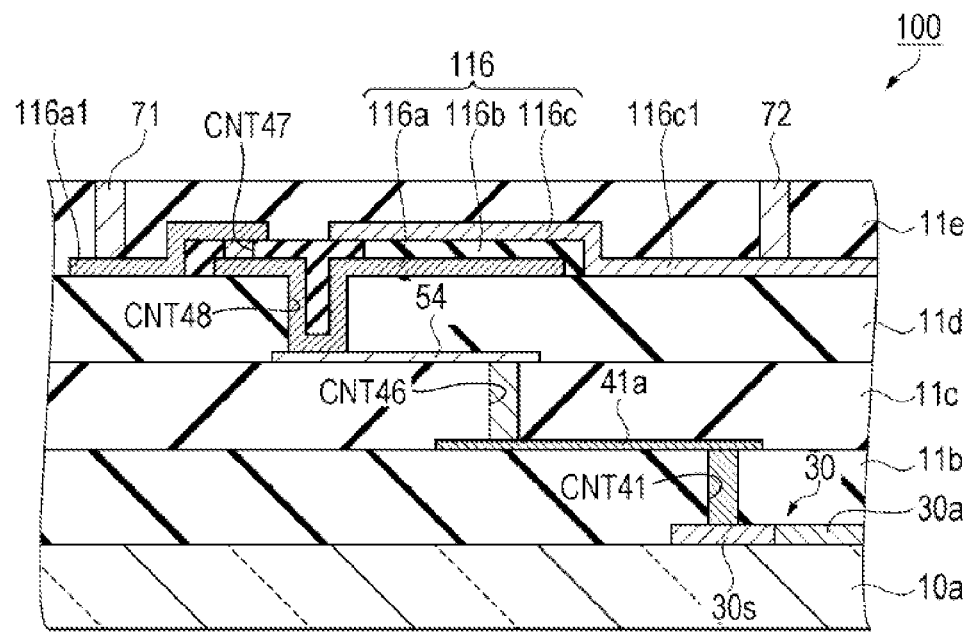

In a process shown in FIG. 9E (first electrode formation process, second electrode formation process), the first pad portion 71 and the second pad portion 72 are formed. More specifically, the pad portions 71 and 72 made of aluminum or the like are formed by using a known film deposition technique, a known photography technique, and a known etching technique. Note that the pad portion may make use of a contact hole itself, or may use a light transmitting conductive film such as ITO or the like as the pixel electrode. Thus, the source region 30s and the first pad portion 71 are electrically connected. Further, the common potential and the second pad portion 72 are electrically connected.

Configuration of Electronic Apparatus

Figure 10:
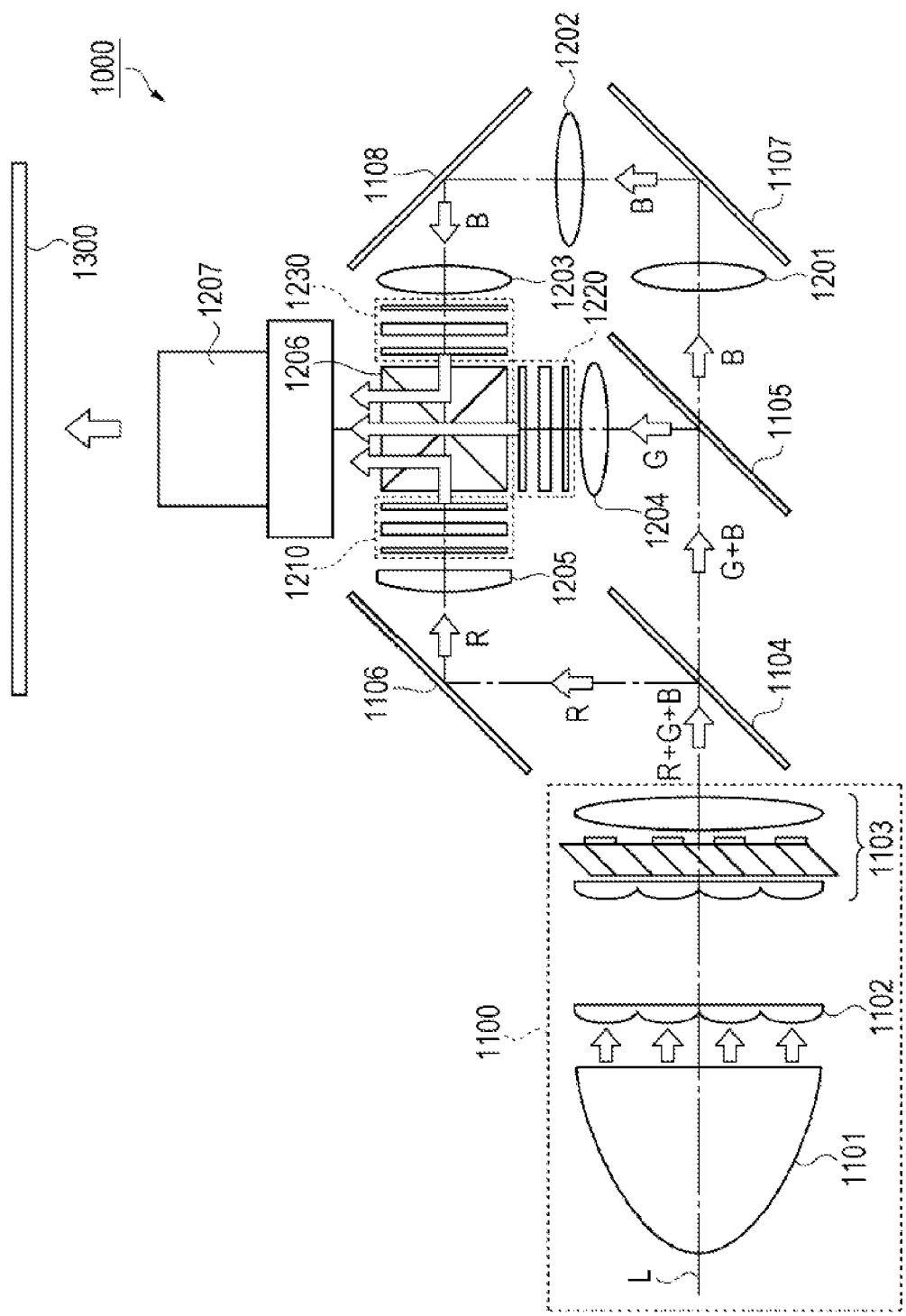
FIG. 10 is a schematic diagram illustrating a configuration of a projection display apparatus including a liquid crystal device.

Next, a projection display apparatus as an electronic apparatus of this embodiment will be described with reference to FIG. 10. FIG. 10 is a schematic diagram illustrating a configuration of a projection display apparatus including the above-described liquid crystal device.

As shown in FIG. 10, a projection display apparatus 1000 of this embodiment includes: a polarization illumination device 1100 disposed along a system optical axis L; two dichroic mirrors 1104 and 1105 as light separation elements; three reflection mirrors 1106, 1107, and 1108; five relay lenses 1201, 1202, 1203, 1204, and 1205; three transmissive liquid crystal light valves 1210, 1220, and 1230 as optical modulation units; a cross dichroic prism 1206 as a light combination element; and a projection lens 1207.

The polarization illumination device 1100 is generally configured of a lamp unit 1101 as a light source formed with a white light source such as an ultrahigh pressure mercury lamp or a halogen lamp, an integrator lens 1102, and a polarization conversion element 1103.

The dichroic mirror 1104 reflects red light (R) and transmits green light (G) and blue light (B) included in a polarized light flux emitted from the polarization illumination device 1100. The other dichroic mirror 1105 reflects green light (G) and transmits blue light (B) having passed the dichroic mirror 1104.

The red light (R) reflected by the dichroic mirror 1104, after being reflected by the reflection mirror 1106, enters the liquid crystal light valve 1210 via the relay lens 1205. The green light (G) reflected by the dichroic mirror 1105 enters the liquid crystal light valve 1220 via the relay lens 1204. The blue light (B) having passed the dichroic mirror 1105 enters the liquid crystal light valve 1230 via a light guide system configured of the three relay lenses 1201, 1202, 1203 and the two reflection mirrors 1107, 1108.

The liquid crystal light valves 1210, 1220, and 1230 are so disposed as to face the incidence surfaces of the cross dichroic prism 1206 for respective color lights. Color lights having entered the respective liquid crystal light valves 1210, 1220, and 1230 are modulated based on image information (image signal) and outputted toward the cross dichroic prism 1206.

The above prism is configured by bonding four rectangular prisms; on the inner surfaces of the prism, a dielectric multi-layer film that reflects red light and another dielectric multi-layer film that reflects blue light are formed in a cross manner. The three color lights are combined by these dielectric multilayer films to be outputted for representing a color image. The combined light is projected, by the projection lens 1207 as a projection optical system, onto a screen 1300 in which the image is enlarged and displayed.

The above-described liquid crystal device 100 is applied to the liquid crystal light valve 1210. The liquid crystal device 100 is disposed between a pair of polarizing elements being disposed in a cross-nicol alignment at an incidence side and an output side of the color light; in this case, the liquid crystal device 100 is spaced from each of the polarizing elements. The other liquid crystal light valves 1220 and 1230 are disposed in the same manner.

According to the above projection display apparatus 1000, high display quality can be realized because the liquid crystal devices 100 in which troubles such as burn-in and the like are suppressed are used as the liquid crystal light valves 1210, 1220, and 1230.

As electronic apparatuses in which the liquid crystal device 100 is mounted, in addition to the projection display apparatus 1000, various kinds of electronic apparatuses can be cited as follows: that is, head-up displays, smart phones, EVFs (Electrical View Finders), mobile mini-projectors, cellular phones, mobile computers, digital cameras, digital video cameras, displays, on-vehicle equipment, audio equipment, exposure apparatuses, illumination equipment, and so on.

As described in detail thus far, according to the liquid crystal device 100, the manufacturing method of the liquid crystal device 100, and the electronic apparatus of this embodiment, the following effects can be obtained.

1. According to the liquid crystal device 100 of this embodiment, because the first pad portion 71 electrically connected with the first electric wire 116$a$1 and the second pad portion 72 electrically connected with the second electric wire 116$c$1 are formed in the same pad insulation layer 11$e$, it is possible to discharge static electricity having accumulated at the first electric wire 116$a$1 (source potential) side through the contact hole CNT71$a$, and discharge static electricity having accumulated at the second electric wire 116$c$1 (common potential) side through the contact hole CNT72$a$. In other words, by providing the contact hole CNT72$a$ aside from the contact hole CNT71$a$, excessive static electricity having accumulated on the electric wires, electrodes, and the like can be suppressed from gathering together and flowing into the contact hole CNT71$a$. That is, breakdown of the source line load capacitor element 116 due to the excessive static electricity can be prevented.

2. According to the manufacturing method of the liquid crystal device 100 of this embodiment, because the contact hole CNT71$a$ electrically connected with the first electric wire 116$a$1 and the contact hole CNT72$a$ electrically connected with the second electric wire 116$c$1 are formed in the same pad insulation 11$e$, it is possible to discharge static electricity having accumulated at the first electric wire 116$a$1 side through the contact hole CNT71$a$, and discharge static electricity having accumulated at the second electric wire 116$c$1 side through the contact hole CNT72$a$. In other words, by forming the contact hole CNT72$a$ aside from the contact hole CNT71$a$, excessive static electricity having accumulated on the electric wires, electrodes, and the like can be suppressed from gathering together and flowing into the contact hole CNT71$a$. That is, it is possible to prevent the breakdown of the source line load capacitor element 116 due to the excessive static electricity.

3. According to the electronic apparatus of this embodiment, the source line load capacitor element 116 can be protected from excessive static electricity in the manufacturing process so that a high production yield thereof can be realized. In addition, by reducing damage to the capacitor insulation film in the manufacturing process, it is possible to supply the electronic apparatus having a higher reliability.

The aspects of this invention are not intended to be limited to the above embodiment, and can be appropriately modified without departing from the scope or spirit of the invention that can be understood from the aspects of the invention and the overall specification. It is to be noted that such modified entities are also included in the technical range of the aspects of this invention. Further, the invention can be implemented in the embodiments as follows.

First Variation

Figure 11:
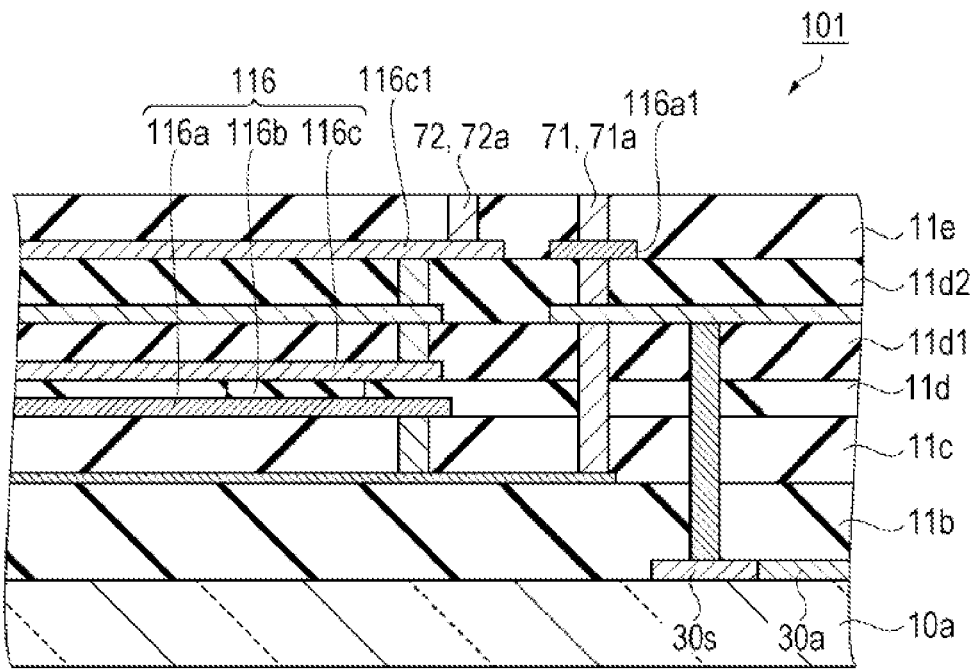
FIG. 11 is a schematic cross-sectional view illustrating a structure of a variation of a liquid crystal device.
Figure 12:
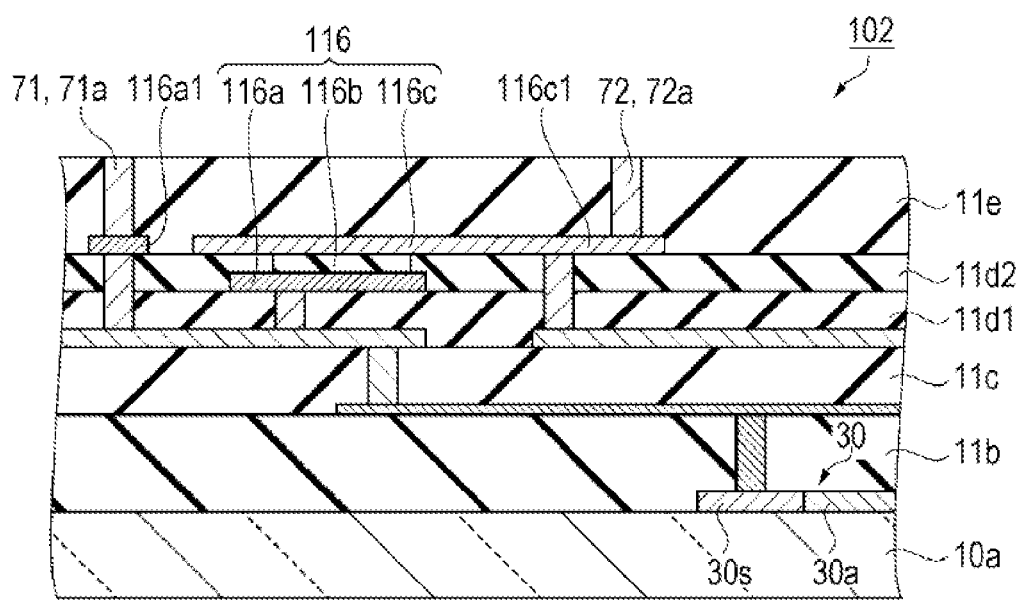
FIG. 12 is a schematic cross-sectional view illustrating a structure of a variation of a liquid crystal device.
Figure 13:
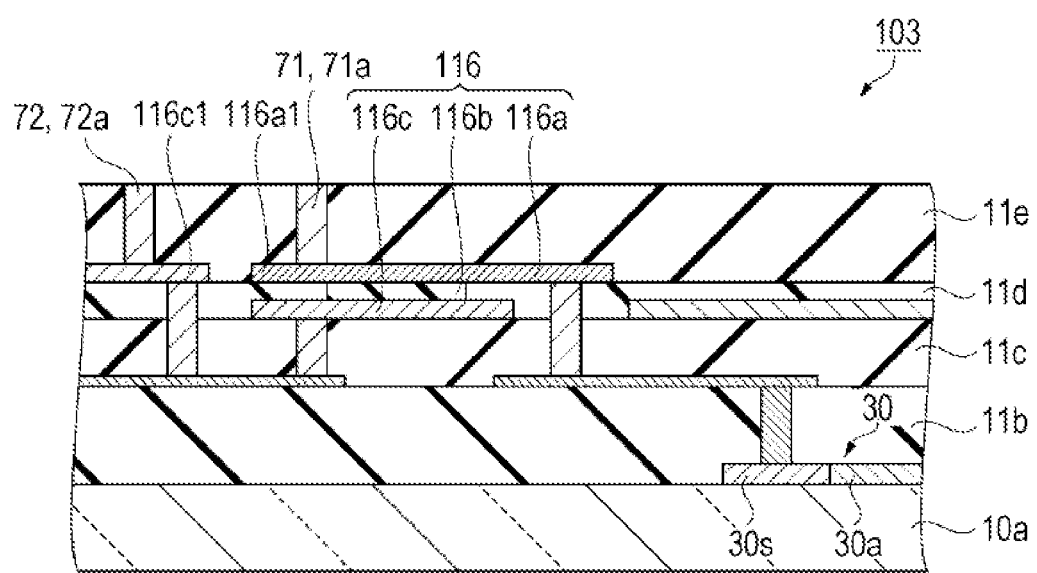
FIG. 13 is a schematic cross-sectional view illustrating a structure of a variation of a liquid crystal device.

As described above, the structure of the liquid crystal device is not limited to the structure as shown in FIG. 7; the liquid crystal device may have the structures as shown in FIGS. 11 through 13. FIGS. 11 through 13 are schematic cross-sectional views each illustrating the structure of a variation of the liquid crystal device.

In a liquid crystal device 101 shown in FIG. 11, the semiconductor layer 30$a$ is provided on the first substrate member 10$a$. The source region 30$s$ of the semiconductor layer 30$a$ is electrically connected with the first load capacitor electrode 116$a$ via a contact hole, a relay electric wire, and the like. Further, the first load capacitor electrode 116$a$ is electrically connected with the first electric wire 116$a$1 via a contact hole. The first electric wire 116$a$1 is electrically connected with the first pad portion 71 that is provided in the pad insulation layer 11$e$ on the first electric wire 116$a$1.

On the first load capacitor electrode 116$a$, the second load capacitor electrode 116$c$ is formed via the load dielectric film 116$b$. The second load capacitor electrode 116$c$ is electrically connected with the second electric wire 116$c$1 via a contact hole, a relay electric wire, and the like. The second electric wire 116$c$1 is electrically connected with the second pad portion 72 that is provided in the pad insulation layer 11$e$ on the second electric wire 116$c$1.

As described above, although the structure of the source line load capacitor element 116 is different from that of the liquid crystal device 100 shown in FIG. 7, it is possible to discharge static electricity having accumulated at the source line side through the contact hole CNT71$a$, and discharge static electricity having accumulated at the common potential side through the contact hole CNT72$a$ because the contact holes CNT71a and CNT72a are provided in the pad insulation layer 11e where the first pad portion 71 and the second pad portion 72 are provided. This makes it possible to prevent the source line load capacitor element 116 from being broken down due to the excessive static electricity.

In a liquid crystal device 102 shown in FIG. 12, the semiconductor layer 30a is provided on the first substrate member 10a. The source region 30s of the semiconductor layer 30a is electrically connected with the first load capacitor electrode 116a via a contact hole, a relay electric wire, and the like. Further, the first load capacitor electrode 116a is electrically connected with the first electric wire 116a1 via a contact hole, a relay electric wire, and the like. The first electric wire 116a1 is electrically connected with the first pad portion 71 that is provided in the pad insulation layer 11e on the first electric wire 116a1.

On the first load capacitor electrode 116a, the second load capacitor electrode 116c is formed via the load dielectric film 116b. The second load capacitor electrode 116c is electrically connected with, via the second electric wire 116c1 extending from the second load capacitor electrode 116c, the second pad portion 72 that is provided in the pad insulation layer 11e on the second electric wire 116c1.

As described above, although the structure of the source line load capacitor element 116 is different from that of the liquid crystal devices 100 and 101 respectively illustrated in FIG. 7 and FIG. 11, it is possible to discharge static electricity at the source line side through the contact hole CNT71a because the contact hole CNT72a before becoming the second pad portion 72 is provided in the same layer in which the contact hole CNT71a before becoming the first pad portion 71 is provided. In addition, static electricity at the common potential side can be discharged through the contact hole CNT72a. This makes it possible to prevent the source line load capacitor element 116 from being broken down due to the excessive static electricity.

In a liquid crystal device 103 shown in FIG. 13, the semiconductor layer 30a is provided on the first substrate member 10a. The source region 30s of the semiconductor layer 30a is electrically connected with the first load capacitor electrode 116a via a contact hole, a relay electric wire, and the like. Further, the first load capacitor electrode 116a is electrically connected with the first electric wire 116a1 being extended. The first electric wire 116a1 is electrically connected with the first pad portion 71 that is provided in the pad insulation layer 11e on the first electric wire 116a1.

On the lower side of the first load capacitor electrode 116a, the second load capacitor electrode 116c is formed via the load dielectric film 116b. The second load capacitor electrode 116c is electrically connected with the second electric wire 116c1 via a contact hole, a relay electric wire, and the like. The second electric wire 116c1 is electrically connected with the second pad portion 72 provided in the pad insulation layer 11e.

As described above, although the structure of the source line load capacitor element 116 is different from that of the liquid crystal devices 100, 101, and 102 respectively illustrated in FIG. 7, FIG. 11, and FIG. 12, it is possible to discharge static electricity at the source line side through the contact hole CNT71a because the contact hole CNT72a before becoming the second pad portion 72 is provided in the same layer in which the contact hole CNT71a before becoming the first pad portion 71 is provided. In addition, static electricity at the common potential side can be discharged through the contact hole CNT72a. This makes it possible to prevent the source line load capacitor element 116 from being broken down due to the excessive static electricity.

Second Variation

As described above, this invention is not limited to the transmissive liquid crystal device 100, and may be applied to a reflective liquid crystal device, for example.

Third Variation

As described thus far, this invention is not limited to using the liquid crystal device 100 as an electrooptic device; the invention may be applied to, for example, organic EL apparatuses, plasma displays, electronic paper, and so on.

The entire disclosure of Japanese Patent Application No. 2013-009022, filed Jan. 22, 2013 is expressly incorporated by reference herein.

What is claimed is:

1. An electrooptic device comprising:
    a transistor;
    a data line electrically connected to the transistor;
    a capacitor that is connected with a source drain region of the transistor, the capacitor having a first capacitor electrode, an insulation film, and a second capacitor electrode, the data line being disposed between the transistor and the capacitor;
    a first insulation layer disposed between the data line and the capacitor;
    a first electric wire electrically connected with the first capacitor electrode;
    a second electric wire electrically connected with the second capacitor electrode; and
    a second insulation layer that covers the first electric wire and the second electric wire, the second insulation layer having a first contact hole and a second contact hole,
    the first contact hole overlapping with the first electric wire, the second contact hole overlapping with the second electric wire in plan view.

2. The electrooptic device according to claim 1, further comprising:
    a first electrode with a first metal film disposed in the first contact hole; and
    a second electrode with a second metal film disposed in the second contact hole.

3. The electrooptic device according to claim 2,
    a source potential being applied to the first electrode and a common potential being applied to the second electrode.

4. The electrooptic device according to claim 1,
    the first capacitor electrode electrically connecting to a pixel electrode.

5. The electrooptic device according to claim 1,
    the first capacitor electrode electrically connecting to a data line.

6. An electronic apparatus comprising the electrooptic device according to claim 1.

7. An electronic apparatus comprising the electrooptic device according to claim 2.

8. An electronic apparatus comprising the electrooptic device according to claim 3.

9. The electrooptic device according to claim 1, wherein the capacitor is disposed between the first insulation layer and the second insulation layer.

10. The electrooptic device according to claim 1, wherein the first electric wire and the second electric wire are disposed between the first insulation layer and the second insulation layer.

* * * * *